United States Patent [19]
Shibano

[11] Patent Number: 5,844,806
[45] Date of Patent: Dec. 1, 1998

[54] WORK PROCESSING STACKING DEVICE

[75] Inventor: Ryozo Shibano, Tajimi, Japan

[73] Assignee: Murata Kikai Kabushiki Kaisha, Kyoto, Japan

[21] Appl. No.: 783,760

[22] Filed: Jan. 15, 1997

[30] Foreign Application Priority Data

Feb. 13, 1996 [JP] Japan .................................... 8-050877

[51] Int. Cl.$^6$ .................................................. G06F 19/00
[52] U.S. Cl. .................. 364/478.05; 414/286; 414/788.1
[58] Field of Search ........................ 364/478.01, 478.04, 364/478.05, 478.11; 414/788.1, 788.7, 273, 286

[56] References Cited

U.S. PATENT DOCUMENTS

4,641,271 2/1987 Konishi et al. ..................... 364/478.05
5,084,829 1/1992 Kato .................................... 364/468.01
5,475,604 12/1995 Nagamatsu .......................... 364/478.05

*Primary Examiner*—Joseph Ruggiero
*Attorney, Agent, or Firm*—Armstrong, Westerman, Hattori, McLeland & Naughton

[57] ABSTRACT

A device that is able to sort and stack processed products according to their intended use, moreover is able to stack efficiently within a limited area and is able to simply produce control programs to affect such processes. Products which have completed a cut-out process by a work processing device are sorted and moved to predetermined positions by a sort stacking device. A product may be automatically picked from pre-processed work, and automatically placed in the sort area. A plurality of products are arranged by an auto-programming device. A produced processing/picking control program and the stacking time control program may be executed by a line controller. The work processing device and the sort stacking device may be simultaneously controlled.

4 Claims, 7 Drawing Sheets

FIG.7A ARRANGEMENT ACCORDING TO SHAPE

POSITIONING BEING CARRIED OUT BY REPRODUCING THE WORK PLACING NESTING

FIG.7B ARRANGEMENT ACCORDING TO PRODUCT GROUP

POSITIONING BEING GROUPED TOGETHER WITH TYPE OF PRODUCT AND GROUP

FIG.7C ARRANGEMENT ACCORDING TO NEXT PROCESS

TO BENDING PROCESS
TO SPOT WELDING PROCESS

POSITIONING BEING GROUPED TOGETHER WITH NEXT PROCESS, SUCH AS BENDING PROCESS AND SPOT WELDING PROCESS

FIG.7D ARRANGEMENT ACCORDING TO ORDER

ORDER No. ......
ORDER No. ......

POSITIONING IN ORDER UNIT

FIG.7E ARRANGEMENT ACCORDING TO STORAGE PERIOD

STORAGE PERIOD
STORAGE PERIOD

POSITIONING BEING GROUPED TOGETHER WITH STORAGE PERIOD

WORK PROCESSING STACKING DEVICE

BACKGROUND OF THE INVENTION

1. Technical Field

This invention relates to a work processing stacking device that cuts out products from work by a work processing device such as a punch press or laser processing device or the like and stacks and sorts those cut out products into stacking areas.

2. Background Art

Conventionally, the following technology has been utilised for the stacking of products after the work has been cut-out processed.

(a) After processing has finished, the product is picked by a picking device and classified into sort boxes.

(b) After processing has finished, stacking is carried out by the reproduction on the stacking side of the positional relationship of the products in the work at the time of picking.

However, using the aforementioned method (a) involving classification into sort boxes, when the number of types of product is high, a plurality of sort boxes need to be arranged. Due to this, the area required for the stacking area increases and effective utilization of floor space decreases. Furthermore, using the method (b) involving stacking being carried out by the reproduction on the stacking side of the positional relationship at the time of picking, after processing it becomes necessary to carry out purpose specific sorting in accordance with the type of product, storage period etc.

SUMMARY OF THE INVENTION

In order to solve the above stated problems, it is an object of the present invention to propose a work processing stacking device that is able to sort and stack processed products according to their intended use, moreover is able to stack efficiently within a limited area and is able to produce those control programs simply.

This work processing stacking device is provided with a a program production means, work processing means and sort stacking means. Based on the product shape data, the program production means produces a processing program for the cut out processing of the work, and a stacking program for the picking of the post-processed product and stacking of it into a predetermined position in the stacking areas by a predetermined sorting. Work processing means executes product processing on the work in accordance with the processing program and is comprised of a work processing device and that control means. Sort stacking means picks and stacks the processed product in accordance with the stacking program and comprises a sort stacking device and that control means.

Accordingly, the processing program for predetermined picking and stacking program are automatically produced by the program production means from the product shape data. A cut out process is then executed on the work by the work processing means in accordance with the processing program. The processed product is then picked by the sort stacking means in accordance with the stacking program and stacked into a predetermined position in the stacking area by a predetermined sorting. Accordingly, regardless of the picking of the product from the pre-processed work, the product can be sorted and stacked. For example, identical products can be stacked in the same place or sorted and stacked corresponding to the next process. As a result, the post-processing operations are reduced.

The stacking program produced by the program production means may also include instructions that control a predetermined attitude when stacking at a predetermined position. In this case, the sort stacking means has a direction changing system for changing the direction of the picked product.

With this structure, as the picking from the pre-processed work and placing in the stacking area can be carried out with the direction of product being freely changed, highly efficient picking from the pre-processed work and placing and stacking area can be carried out.

On these arrangements, the program production means may have a stacking area placing means that determines the stacking position of each product so that the remaining surface area after arrangement of a plurality of products is as small as possible with respect to a fixed surface area being the stacking area.

Due to this, products may be stacked highly efficiently with no waste of the stacking area. Furthermore, when using a product pallet, the number of pallets may be reduced.

DETAILED DESCRIPTION OF THE PREFERRED EMBODIMENT

A first embodiment of the present invention will be described with reference to FIGS. 1 through 7. Firstly, a summary of this device will be described. This work processing stacking device comprises an auto-programming device 1, a work processing device 5 such as a punch press or laser processing device, a sort stacking device 7 comprising a suction transport robot, and a line control means 4. This arrangement picks a product M which has been cut out processed by the work processing device 5, and sorts and stacks it in a predetermined position in a stacking area E.

Figures 7A, 7B:
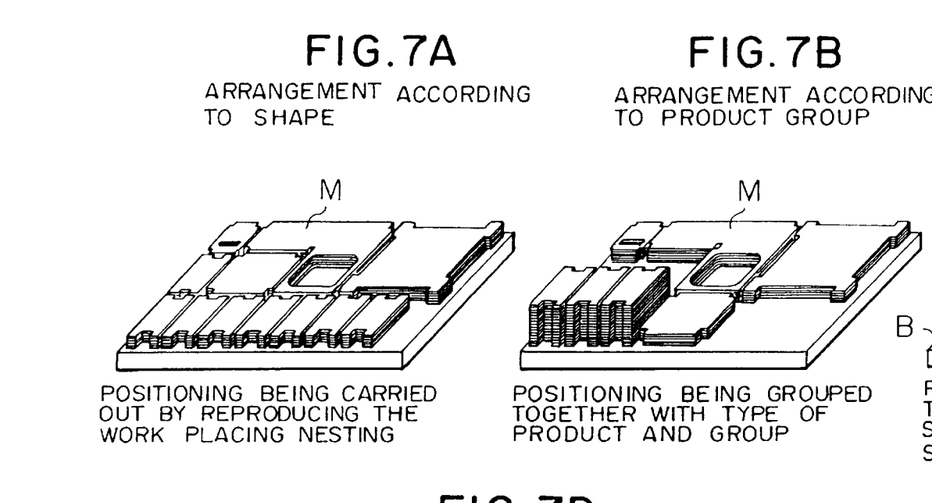
FIGS. 7A to 7E are perspective views, showing each type of sorting method.
Figure 7C:
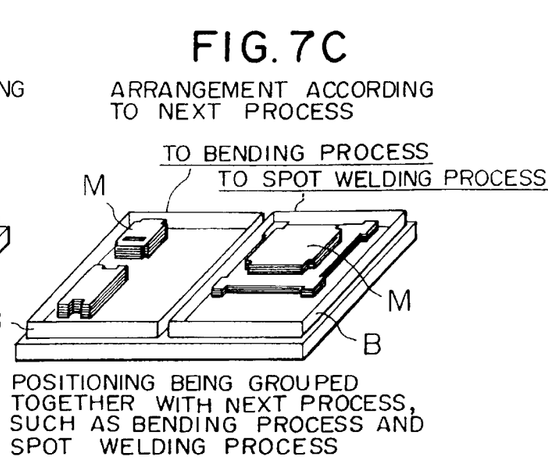
Figure 7D:
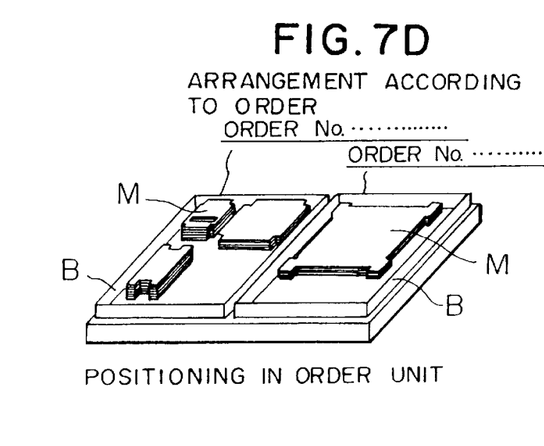
Figure 7E:
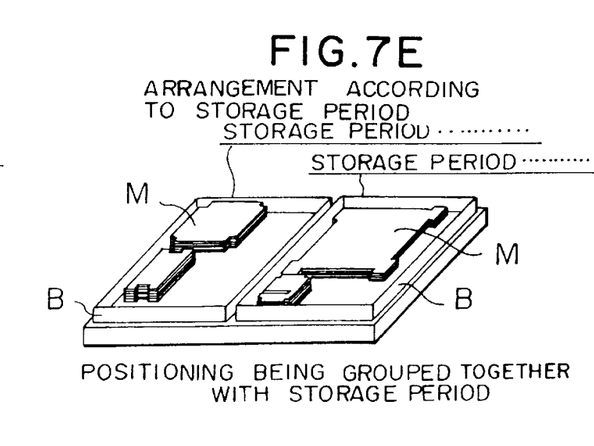

FIGS. 7A to 7E show an example of each type of sorting when stacking is carried out. FIG. 7A is an example of arrangement according to the shape with positioning being carried out by reproducing the positioning of the take-up state of the pre-processed work. FIG. 7B is an example of arrangement according to the product group with different types of product M being positioned in groups. FIG. 7C is an example of arrangement according to the next process with products M having the same next process being grouped together. In this example, the next process is a bending process and spot welding process with the product being placed in separate sort boxes B for each process. FIG. 7D is an example of arrangement according to the order with products M being positioned in order units. Different sort boxes B are used for each different order. FIG. 7E is an example of arrangement according to the storage period with products M of different storage periods being grouped and different sort boxes B being used. When a plurality of sort boxes B are used as with examples as shown in FIGS. 7C to 7E, the stacking area E (FIG. 1) is divided into partitioned sort areas E1,E2 for each sort box B.

On this work processing stacking device, the following technology is possible for these sort methods.
(a) Sorting according to product group.

Making the stacking area E the object for auto-placing (called "auto-nesting") by the auto-programming device 1 and, regardless of the picking from the pre-processed work W, efficiently auto-stacking identical processed products in the stacking area being a limited area.
(b) Sorting according to other purposes.

Converting the purpose specific code attached to each product M into stacking position data (XY address) for each partitioned stacking area E1,E2 and stacking into the arranged sort boxes B according to storage period or the like.

Figure 1:
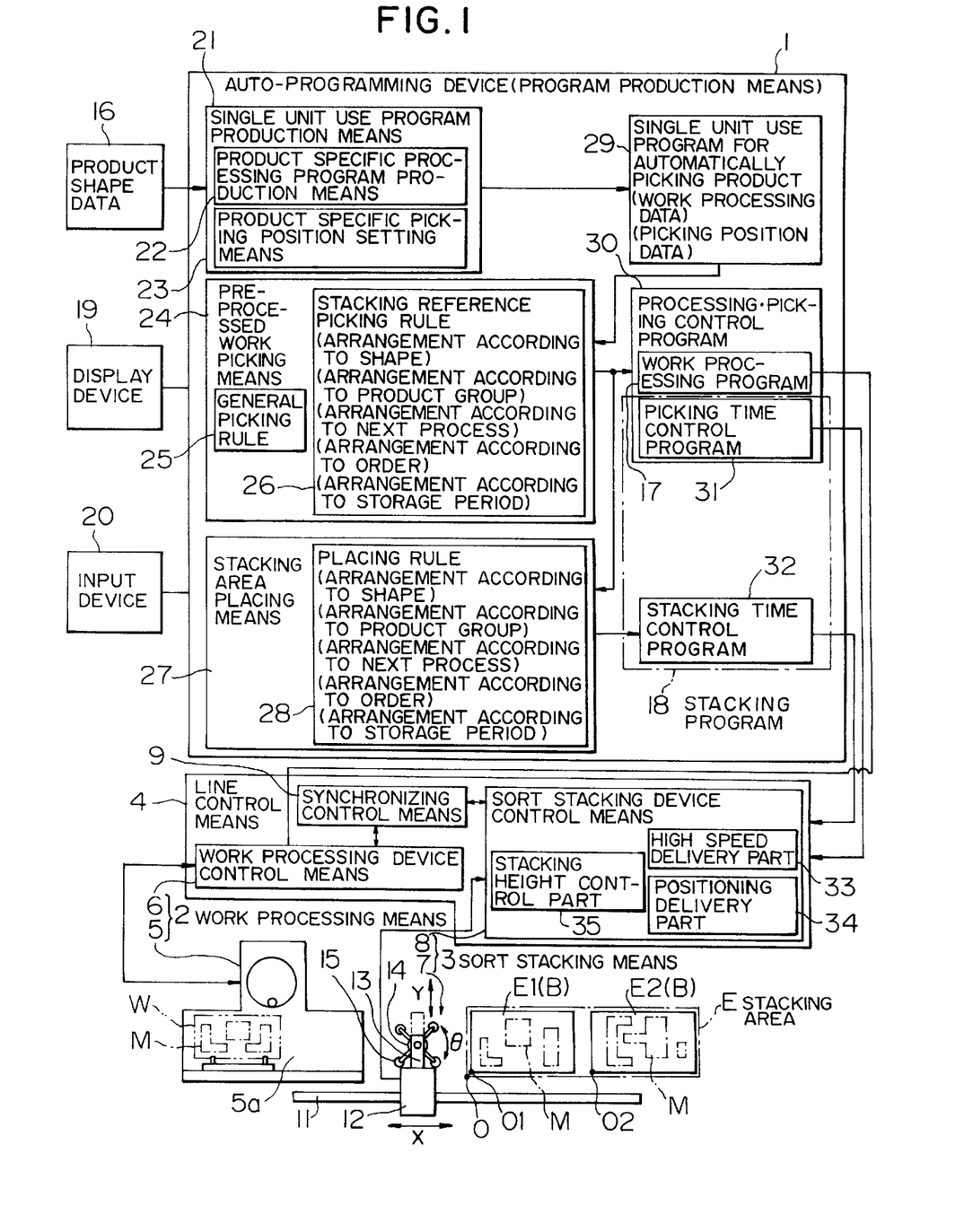
FIG. 1 is a block drawing showing a summarized structure of one embodiment of the present invention.

The auto-programming device 1 comprises a program production means for automatically producing a work processing program 17 and a stacking program 18 based on product shape data 16 and is provided with a display device 19 such as a CRT or the like, and computer device provided with an Input device 20 such as a keyboard or a pointing device or the like. In this example, the auto-programming device 1 is constructed as one part of a CAD/CAM device. A single unit use program production means 21, a pre-processed work picking means 24 and a stacking area placing means 27 are arranged in the auto-programming device 1. The stacking program 18 comprises a picking time control program 31 and a stacking time control program 32.

The line control means 4 comprises a computer device separate from the auto-programming device 1 and is provided with a work processing device control means 6 and a sort stacking device control means 8 for numerically controlling the work processing device 5 and the sort stacking device 7 respectively, and a synchronizing control means 9 that synchronizes both control means 6,8 and carries out predermined controlling. A work processing means 2 comprises the work processing device 5 and the work processing device control means 6. A sort stacking means 3 comprises the sort stacking device 7 and the sort stacking device control means 8.

After product picking, the line control means 4 carries out synchronous control of the work processing device 5 and the sort stacking device 7 based on each NC program 17,31,32 made in the auto-programming device 1 and moves the sort stacking device 7 at high speed to home position 0 of the stacking area E. Afterwards, the sort stacking device 7 is moved at low speed from the stacking area home position 0 with reference to the XY address for each product and stacks products M.

Hereafter, specific details of each structure and those processes and operations will be described.

The work processing device 5 is a device for cutting out the product M from the work W comprising pre-processed material on a table 5a and, in this example, uses a turret type punch press.

The sort stacking device 7 is a means for picking the product M from the work processing device 5 to the work stacking area E (E1,E2) arranged next to the work processing device 5, stacks it in a sorted state and is able to move a suction device 15 along two perpendicular axes X,Y and change the direction of the rotation direction 0. In short, arranged on a carriage 12 which runs along a rail 11 arranged in the direction in which the work processing device 5 and the work stacking area E are lined up (X axis direction), is a laterally slide member 13 which is able to move in a direction perpendicular to this (Y axis direction). The suction device 15 of which the direction may be changed by rotating about a vertical axis is arranged on this laterally slide member 13 via a direction changing system 14. The suction device 15 is arranged with a plurality of suction pads of which the suction position may be changed corresponding to the shape and dimensions of the product M. In the present example, negative pressure suction pads are each attached to a cross-shaped horizontal arm of which each may be freely extended or shortened or the angle between each changed.

The single unit use program production means 21 on the auto-programming device 1 is a means for automatically producing a single unit use program 29 being an NC program for automatically picking a single product M based on the product shape data 16. The single unit use program 29 includes work processing data and picking position data and this data is produced in a product specific processing program production means 22 and a product specific picking position setting means 23 respectively in the single unit use program production means 21.

Figure 2:
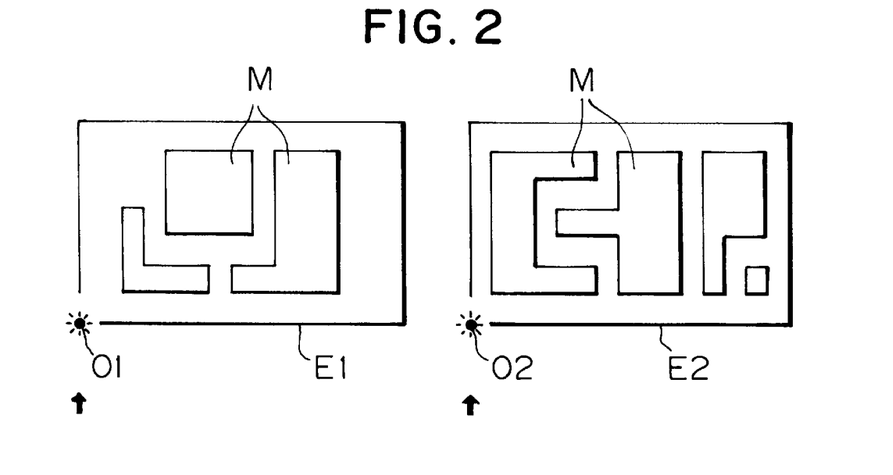
FIG. 2 is an explanatory drawing of the partitioned stacking area when the stacking area is partitioned.
Figure 3B:
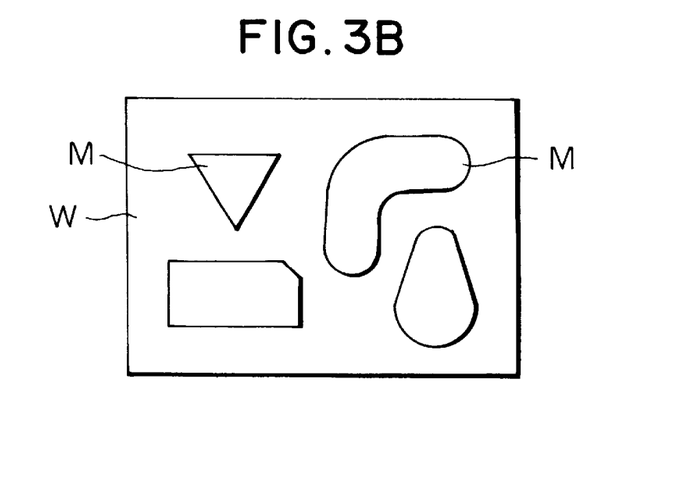
Figure 4:
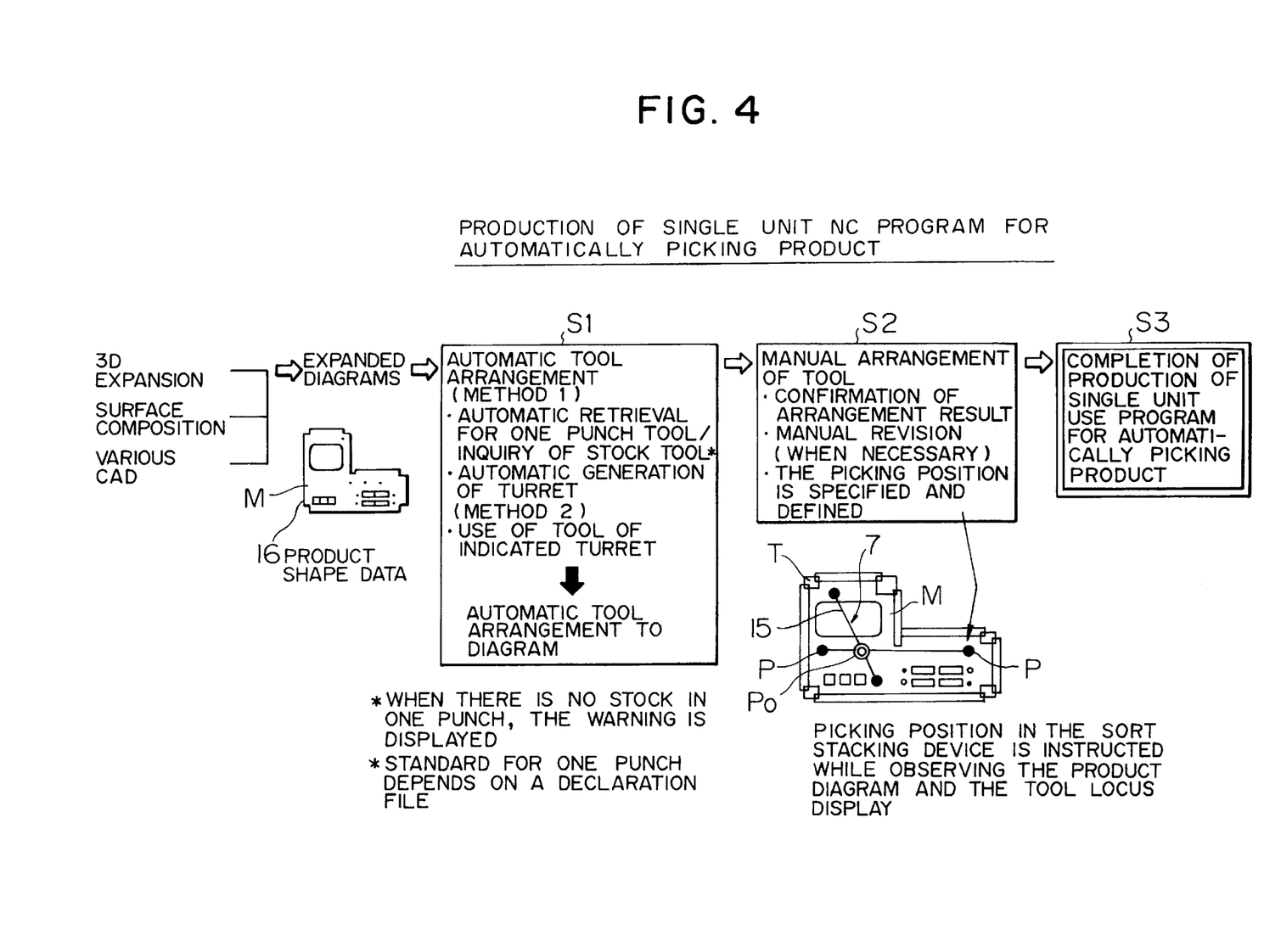
FIG. 4 is a flow drawing of the production process of program for an individual article.

FIG. 4 shows the production process of the single unit use program 29. The product shape data 16 comprises expanded diagrams obtained from the 3D expansion and surface composition of shape data of the bended work product designed by this CAD/CAM device, or comprises shape data obtained by a CAD/CAM device other than this CAD/CAM device. Outer appearance data of the product M and data of the punched out hole in the product when undergoing a punch press process are included in this product shape data 16. As shown in step S1, an automatic tool arrangement is carried out in the product specific processing program production means 22 (FIG. 1) for this product shape data 16. A description of the specific details of the processing at step S1 have been omitted. The result of this automatic tool arrangement is displayed in the display device 19 and confirmed by the operator (S2). As a result of this confirmation, the tool arrangement may be manually revised when necessary. Afterwards, the picking position is specified and defined. This definition is carried out by the operator indicating the center position P0 of the suction device 15 and the position of each suction pad Pa while observing the tool locus display T on the display device screen and diagram display of the suction device 15 of the sort stacking device 7 as shown in the same drawing. This kind of means for making the operator indicate the picking position and that is the single unit use program 29 comprises the product specific picking position setting means 23 of FIG. 1. Thus, the production of the single unit use program 29 for automatic picking is complete. The production of this single unit use program 29 is carried out for each product M and is memorized in a predetermined memory area. It should be noted that the outer appearance of the product M is not limited to the shape enclosed by straight lines as shown in FIGS. 2 and 4 but the product M may also by that having a shape enclosed by curved lines as shown in FIG. 3B.

Figure 5A:
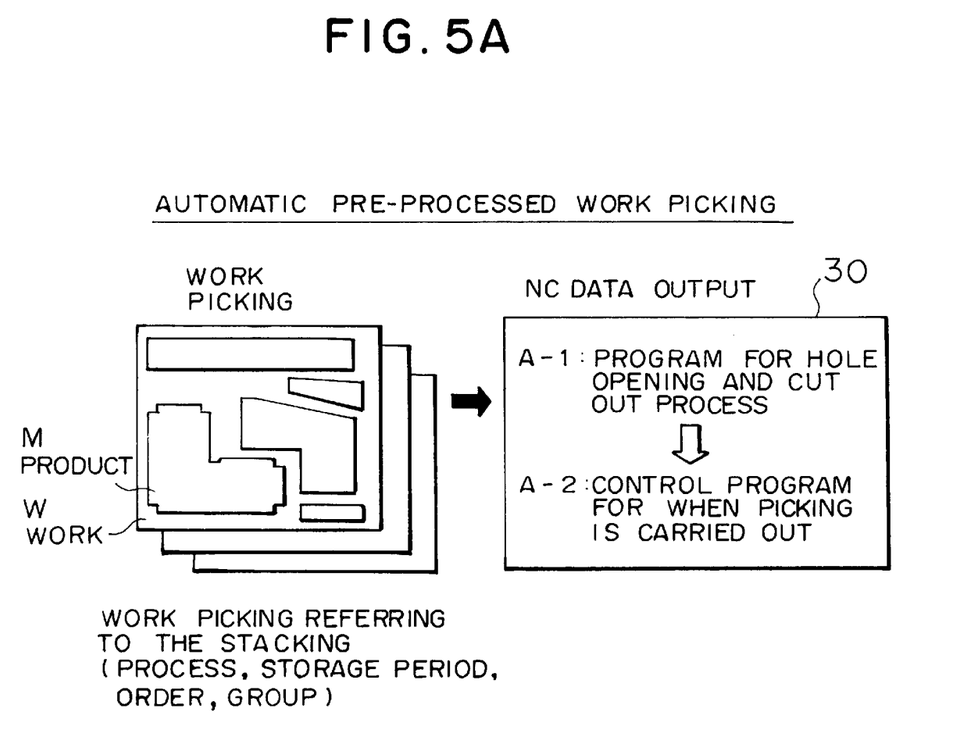
FIGS. 5A and 5B are explanatory drawings of an automatic pre-processed work picking and an automatic area picking.
Figure 5B:
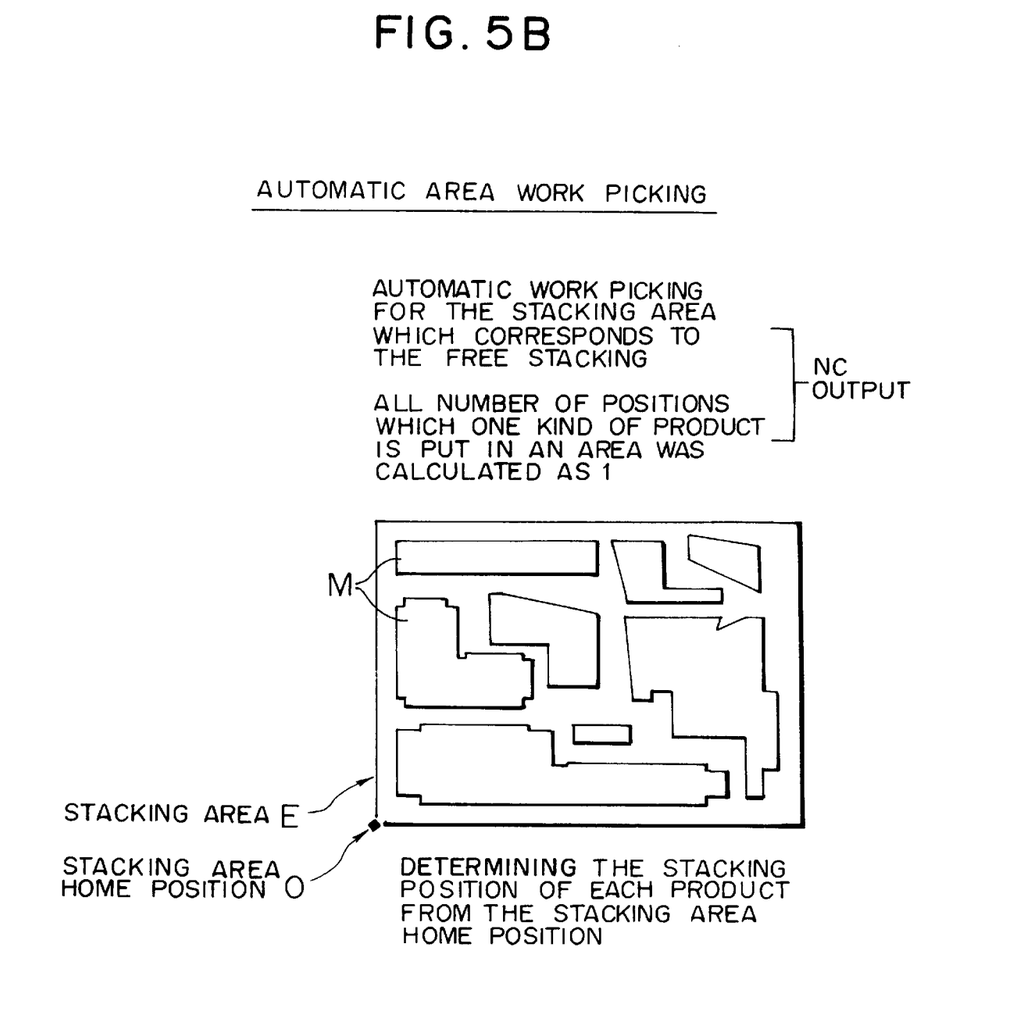

FIGS. 5A and 5B show two types of auto-picking processing, picking by the pre-processed work picking means 24 of FIG. 1 (automatic pre-processed work picking of FIG. 5A) and picking by the stacking area placing means 27 (automatic area picking of FIG. 5B).

The pre-processed work picking means 24 is arranged with a general picking rule 25 and a stacking reference picking rule 26 and placing is possible while referring to the sorting during stacking. Rules concerning the sorting method for each intended purpose which were explained together with FIGS. 7A to 7E (shape arrangement, product group arrangement, next process arrangement, order arrangement, storage period arrangement) are set in the stacking reference picking rule 26 and the rules of a sorting method selected by a predetermined signal are adopted by an input from the operator. The auto-placing of a plurality of products M is carried out so that the yield with respect to the pre-processed work W is made as large as possible by the general picking rule 25 within a range not in violation of this stacking reference picking rule 26. Data including the arranged tool range set in the single unit use program 29 for auto-placing is used as product shape data used when this auto-placing is carried out and auto-placing can be excecuted without hindering the tool arrangement.

In this way, a processing/picking control program 30 is produced from the NC data as a result of picking by the pre-processed work picking means 24. The processing/picking control program 30 edits the single unit use program 29 relating to each product M corresponding to the picking result and includes the work processing program 17 being a program for hole opening and the cut out process, and the picking time control program 31 being a control program for when picking is carried out by the sort stacking device 7.

The stacking area placing means 27 carries out automatic placing of each product M in the stacking area E (E1,E2) in accordance with placing rules 28 and is a means for producing the stacking time control program 32 corresponding to that placing result. The placing rules 28 are arranged with rules corresponding to each type of aforementioned sort method (shape arrangement, product group arrangement, next process arrangement, order arrangement, storage period arrangement) and the desired rule may be selected by a selection instruction from an input by the operator or the like. On the selected sort method, the stacking position of each product M is determined so that the remaining floor area after placement of a plurality of products M is as small as possible with respect to a fixed floor area being the stacking area E. When the sort method that divides the stacking area E into a plurality of partitioned stacking areas E1,E2 is used, auto-placing is carried out which makes the remaining floor area in each partitioned stacking area E1,E2 after placement of a plurality of products M as small as possible.

The stacking position of each of the placed products M is defined as an XY address relative to the stacking area home position 0 by the stacking time control program 32 obtained as a result of the auto-placing. When the stacking area E is partitioned, the stacking position of each of the placed products M is defined as an XY address with respect to home positions 01,02 of the corresponding partitioned stacking areas E1,E2. Furthermore, as a result of this area placing, when a direction changing of the product M is required, the attitude control instruction of that rotation angle θ is described in the stacking time control program 32 together with the XY address.

Figure 3A:
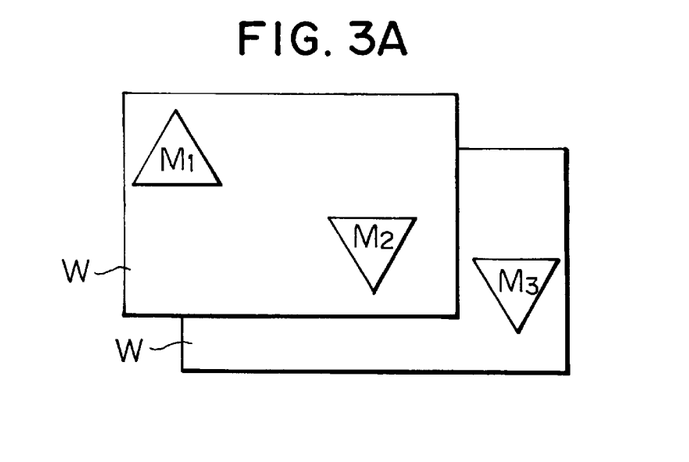
FIGS. 3A and 3B are explanatory drawings of an example of the processing for the product taken from the pre-processed work and an example of that picking.

When the sort stacking device 7 has direction changing functions, as shown by the products $M_1$~$M_3$ shown in FIG. 3A, if the product shape is the same, placing by the stacking area placing means 27 is carried out so that products $M_1$~$M_3$ cut out from a different work W are also stacked as identical products even if the direction in Which the products $M_1$~$M_3$ of the pre-processed work W are facing is different.

Figure 6:
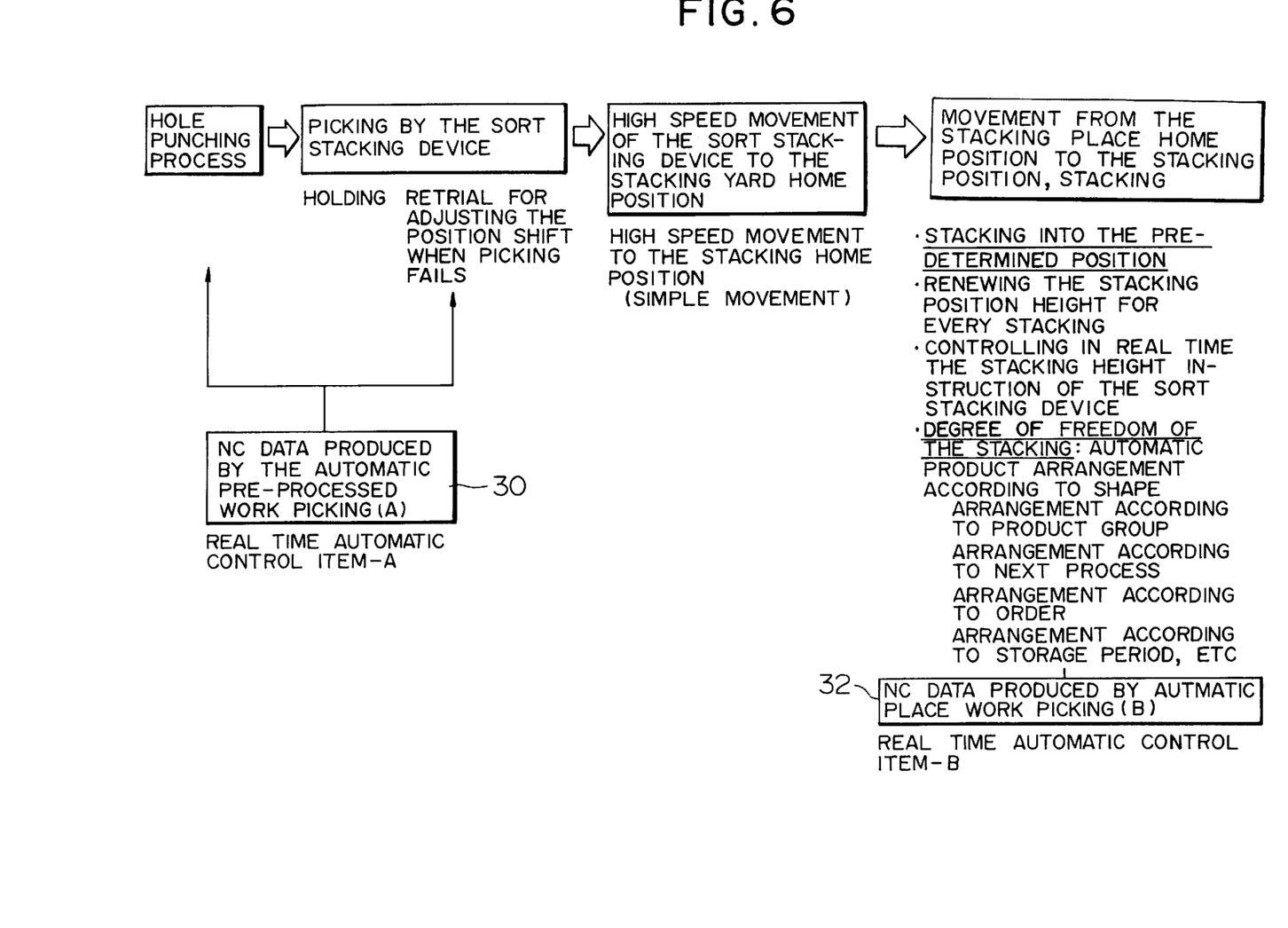
FIG. 6 is a flow drawing of the machine operations.

FIG. 6 shows the machine operations of the line control means 4 of FIG. 1. The line control means 4 amends the NC data already provided by an instantaneous processing based on the two types of NC data being the processing/picking control program 30 obtained by the auto-programming device 1 and the stacking time control program 32, and controls the sort stacking device 7 and the work processing device 5.

Real time control item-A shows the control by NC data (processing/picking control program 30 of FIG. 1) obtained by the auto-preprocessing work picking described in FIG. 5A and after making the work processing device 5 carry out a hole punching processing of an outer shape processing or inner part processing, orders picking by the sort stacking device 7. When picking fails, the picking position is retried from a slightly shifted position.

After picking, the sort stacking device 7 is moved at high speed to the stacking home position 0 by the controls of a high speed delivery part 33 of the line control means 4. In this way, stacking can be carried out as fast as possible due to high speed delivery by the line control means 4, automatic production of the stacking time control program 32 can be easily executed and product stacking can be reliably carried out.

When the sort stacking device 7 reaches the stacking home position 0, controlling of the real time control item-B is carried out. In short, a positioning delivery part 34 of the line control means 4 moves the sort stacking device 7 at low speed (for example by a skip movement) to the stacking position corresponding to the product M determined by the stacking time control program 32 and rotates the sort stacking device 7 in accordance with those instructions when there are attitude changing instructions.

After this kind of positioning, the sort stacking device 7 is lowered by a stacking height control part 35 arranged in the line control means 4 and the product M is stacked into the stacking area E. At this point, the stacking height control part 35 counts and renews the stacking height for every stacking position whenever one product is stacked and controls the stacking height instructions that lower the sort stacking device 7 in real time.

The stacking operations of when the stacking area E is partitioned into a plurality of partitions as shown in FIG. 2 are the same in principle as when there are no partitions but differ by the following points for each partitioned stacking area E1,E2. High speed delivery by the high speed delivery part 33 after product picking Is carried out to the home positions 01,02 of the corresponding partitioned stacking areas E1,E2 and afterwards, moves the sort stacking device 7 to the stacking position by data of the stacking time control program 32. The decision of which partitioned stacking area E1,E2 to correspond to is determined by partition specified data written in the stacking time control program 32. The partition specified data is produced corresponding to each purpose specific code set for each product M when placing is carried out by the stacking area placing means 27. The stacking position data for inside each of the partitioned stacking areas E1,E2 is processed by the same address data (XY address).

It should be noted that in the case of the sort method that divides the stacking area E into a plurality of partitioned stacking areas E1,E2, the stacking area placing means 27 may also convert the purpose specific code arranged on every product into specific data of the partitioned stacking areas E1,E2 and the XY address of inside those partitioned stacking areas E1,E2.

As the work processing stacking device of the present invention is provided with a program production means for producing, from product shape data, processing programs for the cutting out of the work and stacking programs for the picking of the work after processing and stacking of it into a predetermined position in the stacking area by a predetermined sorting, a work processing means that executes product processing on the work in accordance with the processing program, and sort stacking means that picks and stacks the processed product in accordance with the stacking program, regardless of the picking of the product from the pre-processed work, the post-processed product may be efficiently stacked in a limited area and moreover, sorting and stacking specific to the intended purpose can be carried out. Furthermore, the production of the stacking program is simple.

The stacking program includes instructions that control the attitude when stacking and when the sort stacking device has a direction changing system, efficient picking/placing with respect to the pre-processed work and stacking area can be carried out. As a result, the positioning area of the sort box and product pallet need only be small.

When the program production means has a stacking area placing means for determining the stacking position of each product so that the remaining surface area after arrangement of a plurality of products is as small as possible with respect to a fixed floor space being the stacking area, stacking of the products can be carried out efficiently and there is no waste of stacking area.

What is claimed is:

1. A work processing stacking device, comprising:

program production means for producing, from product shape data, processing programs for cutting, out of work, at least a first product at a first product cutting position and a second product at a second product cutting position and from product shape data stacking programs for the picking of at least said first and second products after processing, and for stacking, in the stacking area, at least said first product at a first stacking position and said second product at a second stacking position, work processing means that executes product processing on the work in accordance with the processing program, and sort stacking means that picks and stacks in accordance with the stacking program, wherein a positional relationship between said first and second product cutting positions is different from a positional relationship between said first and second stacking positions.

2. A work processing stacking device as in claim 1, wherein the stacking program produced in the program production means includes instructions that controls a predetermined attitude when stacking at a predetermined position, and the sort stacking means has a direction changing system that changes the direction of the picked product.

3. A work processing stacking device as in claim 1, wherein the program production means has a stacking area placing means for determining the stacking position of each product so that the remaining surface area after arrangement of a plurality of products is as small as possible with respect to a fixed floor space being the stacking area.

4. A work processing stacking device as in claim 2, wherein the program production means has a stacking area placing means for determining the stacking position of each product so that the remaining surface area after arrangement of a plurality of products is as small as possible with respect to a fixed floor space being the stacking area.

\* \* \* \* \*